Dec. 3, 1968     R. P. HAWKINSON     3,413,685
CLAMPING MECHANISM FOR A TIRE PRESS
Filed Nov. 30, 1966     2 Sheets-Sheet 1
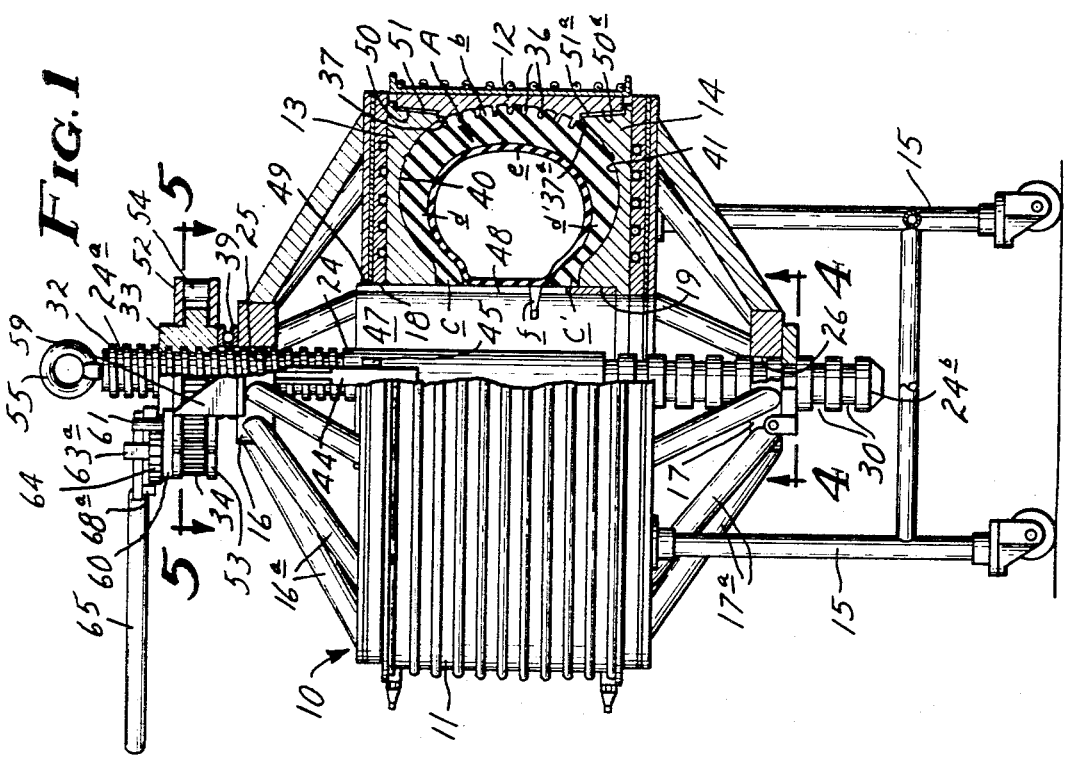
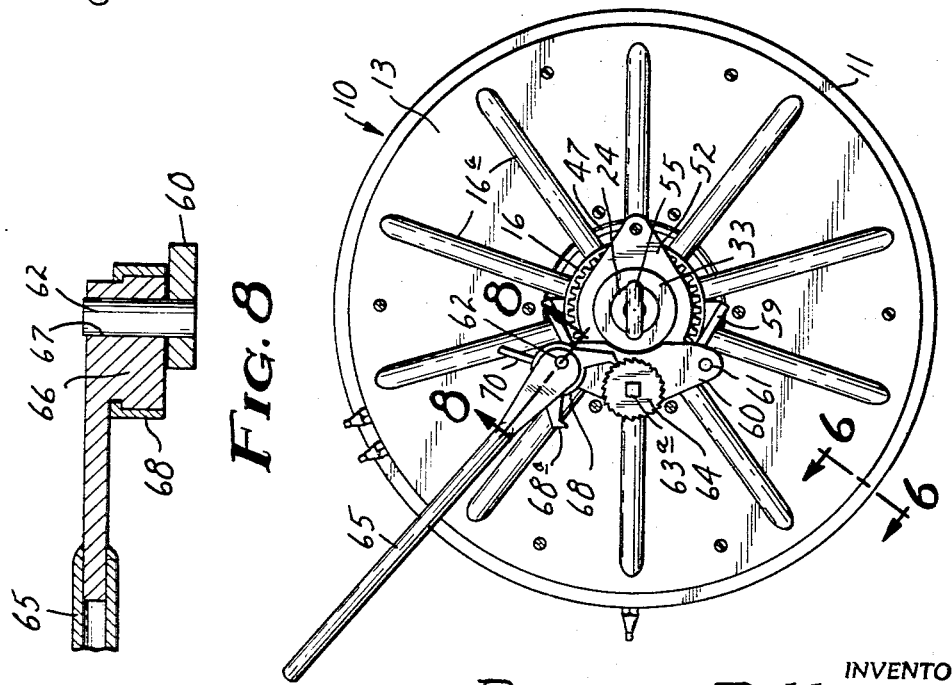
INVENTOR.
RAYMOND P. HAWKINSON
BY Merchant & Gould
ATTORNEYS

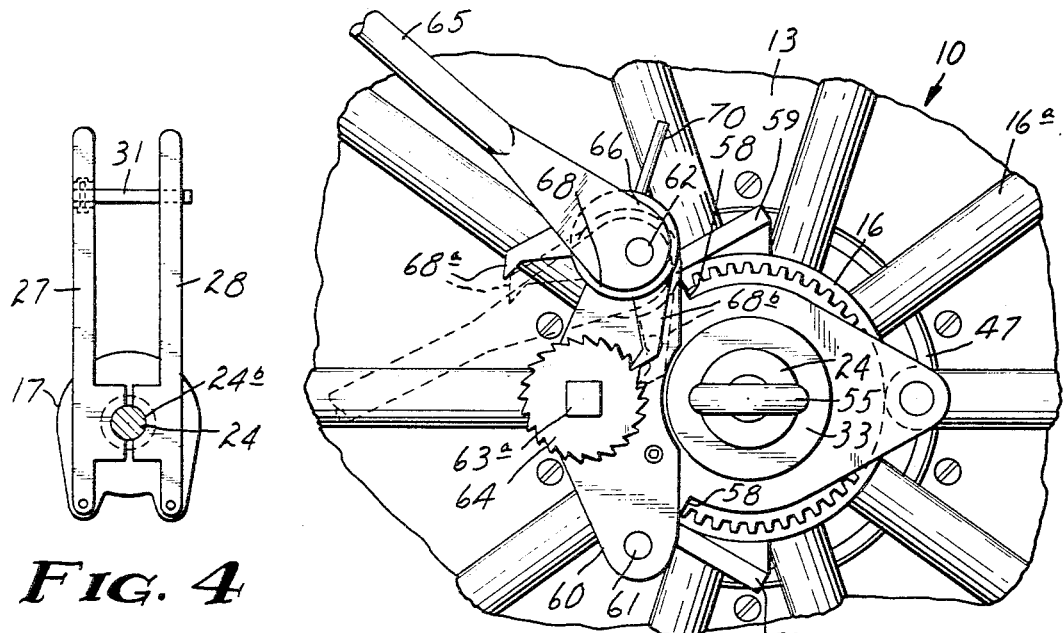
FIG. 4
FIG. 3
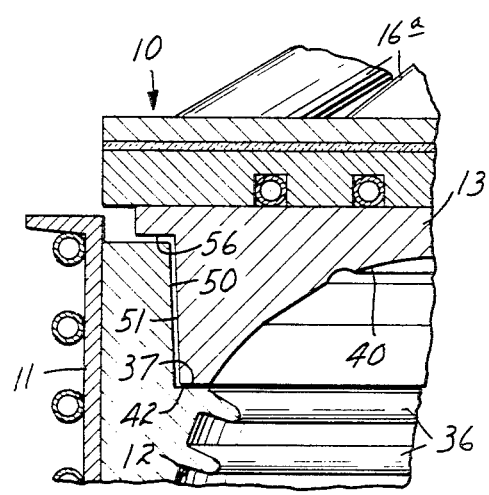
FIG. 6
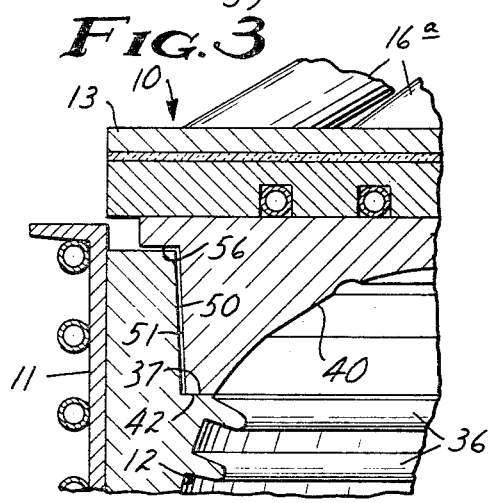
FIG. 7
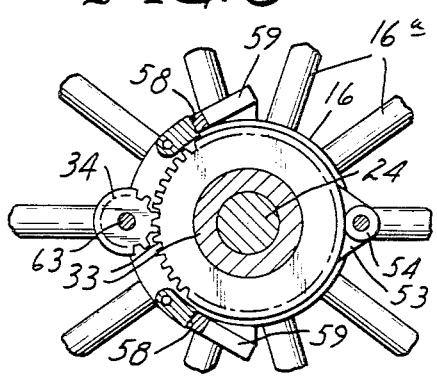
FIG. 5
INVENTOR.
RAYMOND P. HAWKINSON
BY Merchant & Gould
ATTORNEYS United States Patent Office 3,413,685
Patented Dec. 3, 1968

3,413,685
CLAMPING MECHANISM FOR A TIRE PRESS
Raymond P. Hawkinson, Minneapolis, Minn., assignor to Paul E. Hawkinson Company, Minneapolis, Minn., a corporation of Minnesota
Filed Nov. 30, 1966, Ser. No. 597,919
4 Claims. (Cl. 18—18)

ABSTRACT OF THE DISCLOSURE

Tire retreading equipment of the type used to retread heavy-duty tires, capable of applying a retread of the "full cap" type in which the retread may extend completely around the tire from bead to bead, is disclosed. An annular matrix and a pair of oppositely disposed pressure plates cooperate to form a deep cavity retread mold. A cylindrical curing rim extends through axial openings in the pressure plates, matrix section, and tire. An axially positioned clamping device is provided to clamp the two pressure plates tightly against opposite sides of the matrix section.

BACKGROUND OF THE INVENTION

*Field of the invention.*—This invention relates to the field of heavy-duty tire retreading equipment, and more particularly relates to an improved assembly wherein a manually operated ratchet wheel assembly is provided to quickly and easily apply the necessary heavy clamping pressure to the opposed pressure plates.

*Description of the prior art.*—This invention resides in a very crowded field of art, with the basic retreading equipment having been known for many years, and with many improvements having been made on that equipment. For example, the same general type of retreading equipment is shown in the Hawkinson Patent 2,777,163 that issued Jan. 15, 1957. Other improvements that have been made in this type of apparatus are shown in the Sornsen application, Ser. No. 403,580, that was filed Oct. 13, 1964 now Patent No. 3,300,814 in the Larson application Ser. No. 464,075, that was filed June 15, 1965, now Patent No. 3,315,313 and in the Hawkinson application, Ser. No. 596,695, that was filed Nov. 23, 1966, all three of these applications having been assigned to the assignee herein.

SUMMARY OF THE INVENTION

The invention herein includes the reciprocating lever and ratchet wheel assembly that permits the application of heavy clamping forces to the opposed pressure plates.

BRIEF DESCRIPTION OF THE DRAWINGS

FIGURE 1 is a view partially in side elevation and partially in axial section;

FIGURE 2 is a top plan view of the apparatus shown in FIGURE 1;

FIGURE 3 is an enlarged fragmentary top plan view of the apparatus shown in FIGURE 1;

FIGURE 4 is a horizontal section taken along line 4—4 of FIGURE 1;

FIGURE 5 is a horizontal section taken along line 5—5 of FIGURE 1, on an enlarged scale;

FIGURE 6 is an enlarged detailed sectional view taken along line 6—6 of FIGURE 2;

FIGURE 7 is an enlarged detailed sectional view similar to that of FIGURE 6, except that the parts thereof are positioned in a slightly different manner;

FIGURE 8 is an enlarged sectional view taken along line 8—8 of FIGURE 2, parts thereof being broken away.

DESCRIPTION OF THE PREFERRED EMBODIMENT

Referring now to the drawings wherein like characters indicate like parts throughout the several views, the numeral 10 indicates in its entirety a tire retreading apparatus such as is used particularly in the retreading of large tires. Tire retreading apparatus 10 includes an annular matrix section 11 which has a radially inwardly facing surface 12 that is engageable with the crown or tread portion *b* of the tire casing A. Tire casing A includes, in addition to crown portion *b*, a pair of beads *c* and *c'*, and a pair of opposite side walls *d* and *d'*. During the curing or retreading process, a tube *e* is placed in tire casing A to provide the necessary outwardly directed pressure. Tube *e* includes a standard stem *f* for inserting air therein under pressure.

First and second opposed pressure plates 13 and 14 are provided, the latter thereof being equipped with legs 15 to support it on a mounting surface such as a floor. First pressure plate 13 includes a first head portion 16 that is coaxially and upwardly positioned with respect to a central opening 18 in plate 13 by means of a plurality of support members 16a. Second pressure plate 14 includes a head portion 17 that is coaxially and downwardly positioned with respect to a central opening 19 in plate 14 by means of a plurality of support members 17a. For the purpose of clamping pressure plates 13 and 14 against matrix section 11, an elongated screw 24 is provided. Screw 24 includes an upper first end portion 24a and a lower second end portion 24b. Screw 24 projects through central openings 18 and 19, and through axial openings 25 and 26 in head portions 16 and 17.

Screw 24 is provided with means detachably mounting second end 24b thereof for major adjustment of screw 24. Such adjustments depend upon the axial dimensions of matrix 11 and tire casing A. Such means is shown as being in the nature of a pair of clamping arms 27 and 28, pivotally mounted on lower second head 17 for swinging movements of the intermediate portions thereof toward and away from engagement with a selected one of a plurality of annular grooves 30 in end portion 24b. A latch member 31 extends between the outer ends of arms 27 and 28 to securely lock the intermediate portion of each arm within a selected groove 30, thus preventing axial movement of screw 24.

The upper or first end 24a of screw 24 is provided with screw threads 32 which have threaded engagement with a nut 33. Rotation of nut 33 imparts clamping pressure on head 16 through the medium of a thrust bearing 39 to draw plates 13 and 14 into engagement with opposite sides of matrix 11, or to release them from such clamping pressure. Rotation in the proper direction is applied to nut 33 by rotating a toothed gear 34, the teeth of which are meshed to corresponding teeth formed in the periphery of nut 33. Rotation is imparted to gear 34 by means which will hereafter be described.

Referring again to matrix section 11, it can be seen that tread design, groove-forming rib elements 36 are formed on the inwardly facing curing surface 12 thereof. Extending outwardly from the top and bottom edges respectively of the curing surface 12 are a pair of flat sealing surfaces 37 and 37a that face in opposite directions. As previously mentioned, pressure plates 13 and 14 have axial circular openings 18 and 19 formed therein, each having a diameter equal to the diamter of the axial opening of the tire being cured.

Formed in pressure plates 13 and 14 are annular concave faces 40 and 41. Concave faces 40 and 41 are shaped to engage the side wall portions of a tire throughout the full distance from the crown portion to the bead portion thereof. Extending outwardly from the outer edge of each concave face 40 and 41 is a flat sealing surface, designated as 42.

Mounted within pressure plate 14 is a cylindrical curing rim 47 having an outside diameter generally equal to the diameter of axial openings 18 and 19 and equal to the diameter of the central opening in tire A. Curing rim 47 has an elongated slot 48 formed therein to accommodate air stem $f$ of tube $e$. Curing rim 47 has the upper edge or portion thereof beveled as at 49 to facilitate insertion of plate 13 during assembly.

Matrix section 11 also includes first and second circumferentially disposed inwardly facing surface portions 50 and 50a, the surfaces of which extend upwardly and downwardly respectively from the outer edges of sealing surfaces 37 and 37a respectively. Pressure plates 13 and 14 also have circumferentially disposed outwardly facing surface portions 51 and 51a that extend upwardly and downwardly from the outer edges of sealing surfaces 42.

As previously mentioned, nut 33 is rotated in one direction or the other on screw element 24 to either apply or relieve clamping pressure on pressure plates 13 and 14. Rotation is imparted to nut 33 by toothed gear wheel 34. In order to prevent relative rotation between screw element 24 and pressure plate 13, a key element 44 is provided that lies between a pair of lugs 45 on screw 24, and is welded to the first bend portion 16. The remainder of the apparatus for selectively applying or relieving clamping pressure is described as follows: Nut 33 is mounted for rotation in upper and lower pear shaped plate 52 and 53 respectively. At the narrow end of pear shaped plates 52 and 53, is journalled a roller 54 that keeps nut 33 and gear 34 in mesh at all times. Upper plate 52 and lower plate 53 each have outwardly extending cam surfaces 58 formed in the opposite edges thereof to engage V-shaped lugs 59 attached to first head 16 by welding or the like. Lugs 59 prevent upper and lower plates 52 and 53 from rotating about the axis of nut 33. To the upper plate 52 is attached by set screws a mounting bracket 60. Bracket 60 is mounted in a radially spaced generally perpendicular relationship to screw element 24. Mounted bracket 60 has a pair of mounting pins 61 and 62 that extend upwardly therefrom, each being parallel to screw element 24. Pins 61 and 62 are radially positioned with respect to screw element 24 at arcuately spaced points as shown in FIGURES 2 and 3.

A shaft 63 is journalled for rotation in mounting bracket 60 with the axis of rotation thereof parallel to screw element 24. Shaft 63 extends a predetermined distance both above and below bracket 60. Mounted on shaft 63, below bracket 60, is a gear wheel 34. Mounted on shaft 63, above bracket 60, is a ratchet wheel 64. Shaft 63 extends upwardly beyond ratchet wheel 64 and terminates in a square end portion 63a. End portion 63a could also be a hex nut if desired.

Mounted on pin 62 is a reciprocating lever 65 having an eccentric disc 66 mounted at one end thereof. Disc 66 has an offset opening 67 formed therein. The diameter of opening 67 is generally equal to the diameter of pins 61 and 62 so that disc 66 can be journalled on a selected one of said pins.

A V-shaped pawl 68 is provided having pawl elements 68a and 68b at its opposite ends adapted to selectively engage ratchet wheel 64. Mounted at the vertex of pawl 68 is a biasing pin 70. Biasing pin 70 is used to rotate pawl 68 about disc 66 to engage a selected one of the pawl elements 68a or 68b with ratchet wheel 64.

As shown in FIGURES 2 and 3, reciprocating lever 65 is mounted on pin 62 and imparts a clockwise rotation to ratchet wheel 64 when it is moved from the full line to the dotted line position of FIGURE 3. If lever 65 is removed from pin 62 and placed on pin 61, and if biasing pin 70 is used to place the correct pawl element in engagement with ratchet wheel 64, a clockwise rotation can again be imparted wheel 64.

OPERATION

When it is desired to retread a tire casing in the apparatus disclosed herein, the apparatus is first disassembled by backing off nut 33 to release the clamping pressure on the assembly and then releasing clamping arms 27 and 28. After clamping arms 27 and 28 are released from their engagement with groove 30, a hoist or other mechanism (not shown) is attached to a ring 55 carried by screw 24. The upper portion of the assembly, including head 16 and pressure plate 13 can thus be lifted away from the remainder of the assembly.

After presusre plate 13 is removed, matrix section 11 and tire A are lifted upwardly and away from curing rim 47. Tire A can then be removed from matrix section 11. At this point in the disassembly of the apparatus, bottom pressure plate 14 with curing rim 47 attached thereto, remains standing on legs 15. When it is desired to retread another tire casing, the casing together with new tread is first placed within matrix section 11. A tube is placed within the tire. Matrix section 11, tire A, and tube $e$ are then inserted over curing rim 47 with air stem $f$ sliding downwardly through elongated slot 48. Pressure plate 13 is then inserted over curing rim 47 as shown in FIGURE 1 and the necessary clamping pressure applied.

Pressure plates 13 and 14 are held in accurate coaxial alignment by means of curing rim 47. Accurate parallel alignment of pressure plates 13 and 14 is established by clamping sealing surfaces 42 against sealing surfaces 37 and 37a. To assure that the previously mentioned adjoining sealing surfaces can be tightly joined without any interference caused by a binding of adjoining surface portions, surface portion 51 is spaced a predetermined distance from surface portion 50, and surface portion 51a is spaced the same predetermined distance from surface portion 50a. The same spacing is provided between an overhanging lip surface 56 of plate 13 and matrix section 11, and between a similar overhanging lip surface 56 of plate 14 and matrix section 11. This spacing of the various surfaces is perhaps most clearly shown in FIGURES 6 and 7.

As previously mentioned, clamping pressure is applied to pressure plates 13 and 14 by tightening nut 33 on screw element 24. When the tire retreading apparatus 10 is first assembled, an impact wrench is normally used on square end portion 63a to provide the initial rotation of shaft 63. The impact wrench is used until it reaches the limit of its torque capabilities. It has been determined, however, that an impact wrench cannot impart sufficient torque to shaft 63 to apply the necessary clamping pressure to plates 13 and 14. FIGURE 6 thus discloses the apparatus as it stands after clamping pressure has been applied by an impact wrench. FIGURE 6 illustrates the fact that it is not possible to obtain with an impact wrench the pressure necessary to tightly join sealing surfaces 42 with sealing surfaces 37 and 37a. Unless these sealing surfaces are tightly jointed, accurate parallel alignment of plates 13 and 14 cannot be achieved.

FIGURE 7 discloses the desired relationship between sealing surface 42 and the sealing surface 37 when the proper amount of clamping pressure is applied. This clamping pressure is achieved by first rotating shaft 63 with an impact wrench or other hand operated tool. When no further tightening is possible with the impact wrench, reciprocating lever 65 is placed on pin 62 (or pin 61). Biasing pin 70 is then used to move pawl element 68b into contact with ratchet wheel 64 as shown in the full line drawing of FIGURE 3. Lever 65 is then rotated in a counterclockwise direction to the dashed line position of FIGURE 3 to rotate ratchet wheel 64 in a clockwise direction to tighten nut 33. By this means, the necessary heavy clamping pressure is applied. The heavy clamping pressure can be relieved by using an impact wrench on end portion 63a to turn shaft 63 in a counterclockwise direction. Even though an impact wrench cannot apply sufficient torque to achieve the necessary heavy clamping pressure, it can apply sufficient torque to relieve that pressure once it has been provided by another means.

While I have shown and described a preferred embodiment of my invention herein, it will be understood that various modifications may be made in the structure without departing from my invention. Therefore, I intend to be limited only by the spirit and scope of the appended claims.

What is claimed is:

1. In a press for retreading pneumatic tire casings:
   (a) first and second pressure plates adapted to engage and apply pressure to opposite side walls of a tire casing interposed therebetween;
   (b) a screw element, having first and second end portions, extending axially through said plates;
   (c) said first plate having thereon a first head slidably receivable over said first end portion of said screw element;
   (d) said second plate having thereon a second head for releasably securing said second plate to said second portion of said screw element to prevent axial movement of said screw element;
   (e) a nut having threaded engagement with said first end portion of said screw element axially outwardly of said first head and adapted to impart clamping pressure to said plates;
   (f) the peripheral edge of said nut defining a plurality of circumferentially spaced teeth;
   (g) means limiting relative rotary movement of said screw element with respect to said first plate; and
   (h) the improvement comprising: means for imparting rotary movements to said nut, said means including:
      (1) a mounting bracket carried by said first head in a radially spaced generally perpendicular relationship to said screw element, said mounting bracket having a mounting pin extending upwardly therefrom, said pin being mounted in parallel with said screw element and being radially spaced therefrom;
      (2) a shaft journalled for rotation in said mounting bracket about an axis parallel to said screw element;
      (3) a ratchet wheel mounted on said shaft in overlying relationship to said mounting bracket;
      (4) a toothed gear wheel mounted on said shaft in an underlying relationship to said mounting bracket, said toothed gear wheel being engaged with said teeth on said nut;
      (5) a reciprocating lever having an eccentric disc mounted at one end thereof, said disc having an offset opening formed therein; and
      (6) a pawl journalling said eccentric disc and defining a pawl element adapted to engage said ratchet wheel; said lever being positioned with said opening in said eccentric disc journalled on said pin whereby said pawl element engages said ratchet wheel to impart rotary movements to said ratchet wheel, said shaft, said gear wheel, and said nut upon reciprocation of said lever.

2. The apparatus of claim 1 wherein said pawl is V-shaped and includes a second pawl element, said pawl elements being located at the opposite ends of said V-shaped pawl, and wherein said V-shaped pawl is mounted for rotation on said eccentric disc at the vertex of said pawl.

3. The apparatus of claim 2 including said mounting bracket having a second mounting pin extending upwardly therefrom in parallel with said screw element and being radially spaced therefrom, said pins being arcuately spaced and positioned on generally opposite sides of said ratchet wheel.

4. The apparatus of claim 3 including means for biasing a selected one of said pawl elements toward operative engagement with said ratchet wheel.

References Cited

UNITED STATES PATENTS

| | | | |
|---|---|---|---|
| 2,777,163 | 1/1957 | Hawkinson | 18—18 |
| 2,826,783 | 3/1958 | Robbins | 18—18 |
| 3,300,814 | 1/1967 | Sornsen | 18—18 |
| 3,315,312 | 4/1967 | Larson | 18—18 |

J. HOWARD FLINT, JR., *Primary Examiner.*